Aug. 28, 1928.

J. LEDWINKA 1,682,620

APPARATUS FOR ELECTRICAL VULCANIZING

Filed Jan. 10, 1922  6 Sheets-Sheet 1

Fig 1

INVENTOR.
JOSEPH LEDWINKA
BY
ATTORNEY.

Aug. 28, 1928.  1,682,620
J. LEDWINKA
APPARATUS FOR ELECTRICAL VULCANIZING
Filed Jan. 10. 1922   6 Sheets-Sheet 2

INVENTOR.
JOSEPH LEDWINKA
BY
ATTORNEY.

Aug. 28, 1928.  1,682,620
J. LEDWiNKA
APPARATUS FOR ELECTRICAL VULCANIZING
Filed Jan. 10. 1922  6 Sheets-Sheet 4

Fig 5

Witness
Walter M. Trout.

INVENTOR.
JOSEPH LEDWINKA
BY
C. B. Desjardins
ATTORNEY.

Aug. 28, 1928.  
J. LEDWINKA  
1,682,620  
APPARATUS FOR ELECTRICAL VULCANIZING  
Filed Jan. 10. 1922  
6 Sheets-Sheet 5

Fig 6

Witness  
Walter M. Trout

INVENTOR.  
JOSEPH LEDWINKA  
BY  
C.B. DesJardins  
ATTORNEY.

Aug. 28, 1928.　　　　　　　　　　　　　　　　　　　　1,682,620
J. LEDWINKA
APPARATUS FOR ELECTRICAL VULCANIZING
Filed Jan. 10. 1922　　　6 Sheets-Sheet 6

Fig 7

INVENTOR.
JOSEPH LEDWINKA
BY
ATTORNEY.

Patented Aug. 28, 1928.

1,682,620

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

APPARATUS FOR ELECTRICAL VULCANIZING.

Application filed January 10, 1922. Serial No. 528,141.

This invention relates to vulcanizing apparatus, and particularly to such apparatus wherein the article to be vulcanized is subjected simultaneously to pressure and heat, the heating action being accomplished electrically.

One of the objects of the invention is to provide a vulcanizing apparatus wherein pressure is applied to the mold in which the article to be vulcanized is enclosed, and electric current is simultaneously induced in the mold, or in the core on which the article to be vulcanized is formed or carried, whereby the article to be vulcanized is subjected simultaneously to pressure and heat generated by such induced electric current.

A further object of the invention is to provide a vulcanizing apparatus employing a mold within which the article to be vulcanized is enclosed, and wherein such mold constitutes the secondary of a transformer, and means for supporting the mold in position to be enclosed by the transformer core.

A further object of the invention is to provide a vulcanizing apparatus in which the article to be formed is carried by a core, and wherein the core is supported in position to constitute the secondary of a transformer.

A further object of the invention is to provide means for so supporting a core or mold, or both, as to form a single turn closed secondary of a transformer, and which will permit the easy removal of the article to be vulcanized at the completion of the vulcanizing operation.

A further object is to provide a vulcanizing apparatus employing a mold within which the article to be vulcanized is enclosed, and wherein a sectional core of a transformer is threaded through such mold.

A further object of the invention is to provide a vulcanizing apparatus of the nature referred to wherein a plurality of transformer core sections are employed adapted to be brought together into encompassing relation with respect to portions of the mold or core, or both, said mold, or core, or both, constituting the secondary or secondaries for the transformer.

A further object of the invention is to provide a vulcanizing apparatus which is simple and efficient in operation, economical to manufacture and use.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the drawings,—

The same reference numerals refer to the same parts throughout the several views.

In my Patent, No. 1,348,228, granted August 3, 1920, I have set forth, described and claimed a method of and means for vulcanizing, wherein the mold within which the article is to be vulcanized is made of metal, and the core of an electric transformer is threaded through the mold, and through the primary of the transformer, whereby the mold becomes a closed single turn secondary of the transformer.

The present invention relates generally to apparatus for carrying out the process of said patent, and more particularly to means whereby pressure is applied to the article to be vulcanized simultaneously with the application of heat generated by the electric current induced in the mold constituting the secondary of the transformer, and wherein means are provided for efficiently supporting the article to be vulcanized, and which permits the ready detachment and removal of the article at the completion of the vulcanizing operation.

While my invention is applicable to vulcanizing various articles, it is shown as applied to vulcanizing automobile tires. In its broadest scope as defined in the claims, however, I do not desire to be limited or restricted in respect to this use of the apparatus.

In the manufacture of tires for automobiles, or the like, generally it is the present practice to build up the tires on cores, and bolt, or otherwise secure, the mold sections therearound. This unit is then placed within the steam chamber and subjected to the resulting heat and pressure to effect the vulcanizing of the tire. This operation is open to many practical and mechanical objections, and requires the use of molds which are heavy and cumbersome and difficult to handle. Moreover, a very great amount of heat is required to bring the molds to the desired temperature to effect the vulcanization of the tire. The apparatus employed is expensive and the operation requires a great deal of time.

It is among the special purposes of my present invention to avoid these and many other objections, and generally in carrying out my invention I propose to position the tire between the opposed faces of the mold sections, and to provide a support for the tire and for the core upon which the tire is built, which permits the ready and easy application thereto of a tire to be vulcanized and its core and the removal of the same therefrom at the completion of the vulcanizing operation, and I associate with each section of the mold transformer core units, one or more, which, when the sections are closed upon each other, and upon the tire, or other article to be vulcanized, are threaded through the closed mold, and the core, if a core is used, so as to constitute of such mold or core, or both, a closed single turn secondary of the transformer. I also propose to so construct the apparatus as to impose the desired pressure upon the tire or other article to be vulcanized simultaneously with the generation of heat caused by the current of the electricity induced in the secondary of the transformer. I also propose in accordance with my invention to employ with each section or half of the mold a plurality of transformer core units, the units associated with one mold section cooperating with a corresponding transformer core unit associated with the other mold section when the two mold sections are brought together under pressure in enclosing relation with respect to the tire, or other article, to be vulcanized, each transformer core unit being composed of laminations. I also propose in accordance with my invention to provide means for efficiently applying pressure to the mold units when brought together into vulcanizing position, but which permits the ready and easy separation of the mold sections and transformer core units to permit the insertion or removal of a tire or other article to be vulcanized from or into position between the opposed surfaces of the mold sections.

Figure 5:
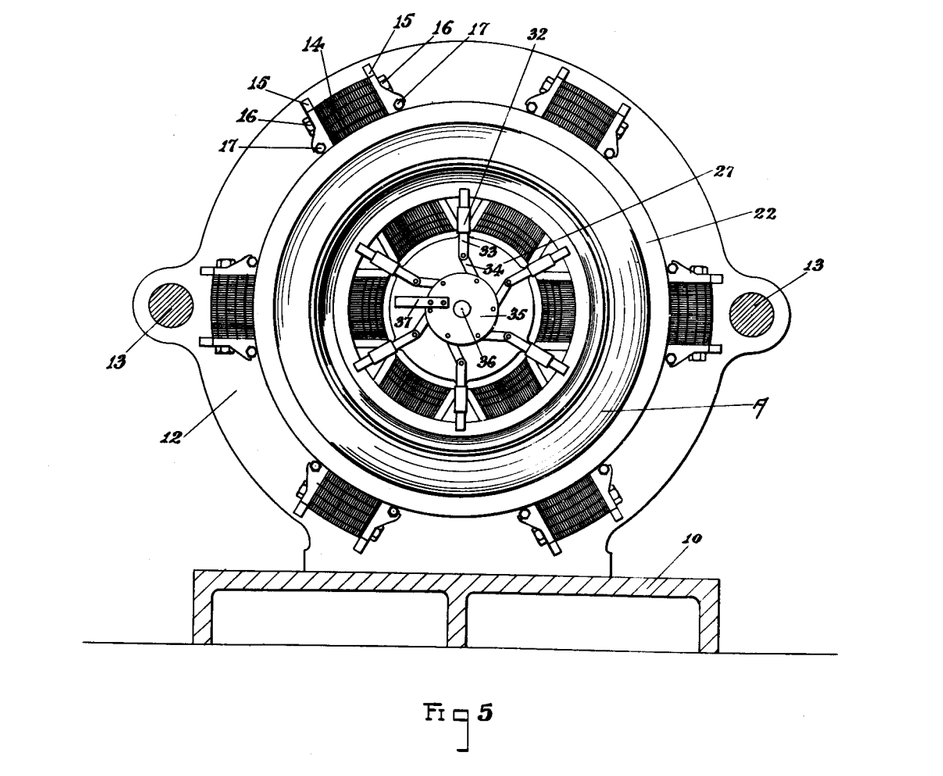
Fig. 5 is a view in vertical section on the line 5, 5, Fig. 1.
Figure 6:
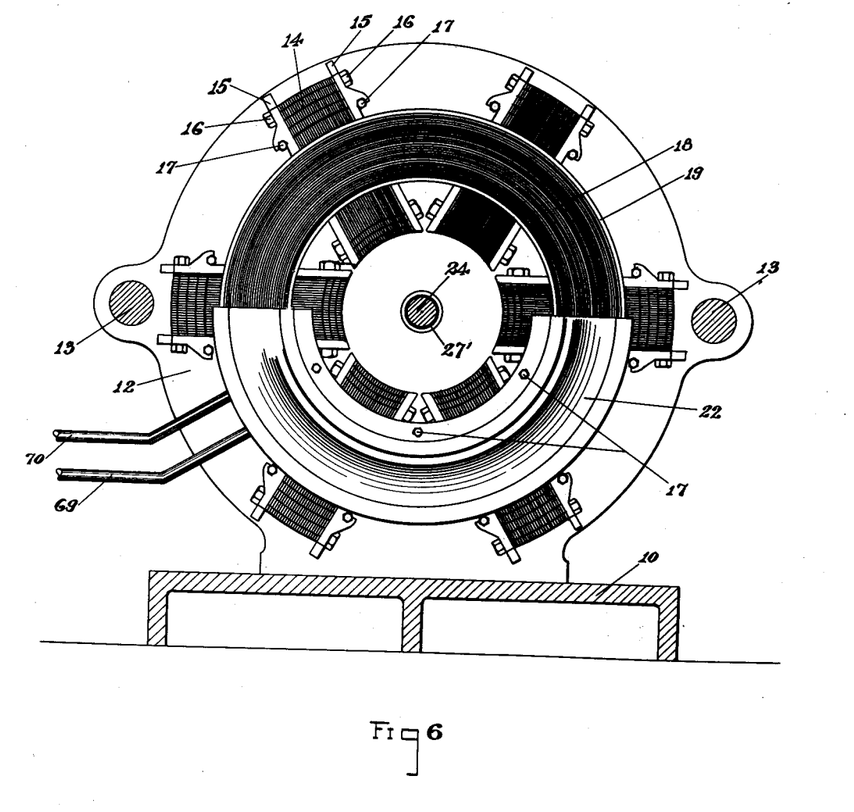
Fig. 6 is a view taken on the same line as Fig. 5, with the core and tire and the core support removed, and the tire mold section broken out in the upper half of the view.
Figure 7:
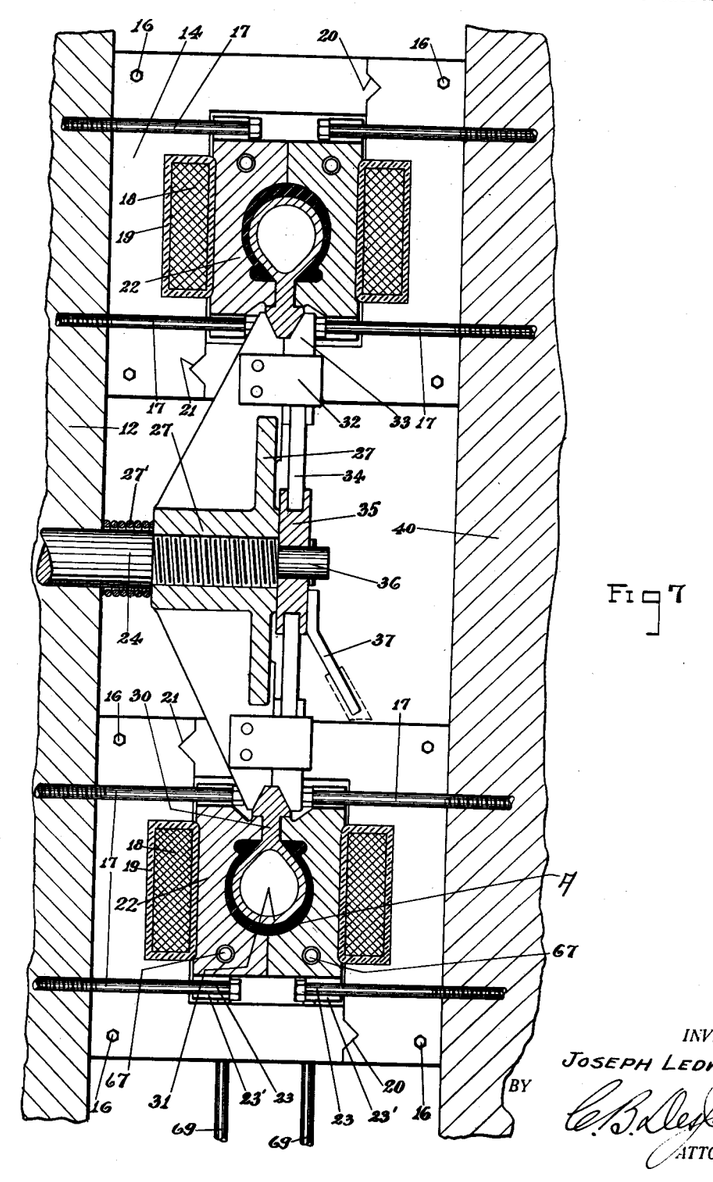
Fig. 7 is a broken view in section on the line 3, 3, Fig. 1, upon a somewhat enlarged scale and showing the sections of the mold and transformer cores in closed position.

Referring specifically to the structure shown as illustrating one practical embodiment of my invention, I provide a base member 10, to which are attached the opposed fixed heads 11, 12, at opposite ends thereof. Tie rods 13 connect these heads. Mounted to slide or to be moved towards and from the fixed head 12 is a member 40, which I will refer to as a ram. The tie rods 13, if desired, serve as guides for this ram. Upon the opposed faces of said head 12 and ram 40, are respectively mounted the mold sections or halves 22, 53, and their associated transformer members, which, in this instance, consist of the transformer primary coils 18, 51, and a plurality of core units. Each core unit in the arrangement shown consists of a series of metallic laminations 14 and 45 of generally L-shape disposed in planes at right angles to the faces or surfaces of the head 12 and ram 40, the several laminations composing a transformer unit section being clamped together between plates 15, 46, see Fig. 5, by means of the bolts 16, 47. The opposing surfaces of the cooperating transformer core unit sections are formed with projections 20, 49, and recesses 21, 50, which are designed to be received and fit into each other when the parts are closed together into vulcanizing position as shown in Fig. 7. The various cooperating pairs of transformer core unit sections are disposed in suitable annular relation in the case of an automobile tire, as clearly shown in Figs. 5 and 6. The opposing faces of the transformer core unit sections are recessed to receive the primary windings 18 and 51 of the transformer, said primary windings being insulated from the laminations composing the transformer core sections by means of the insulation 19 and 52.

By constructing the transformer core unit sections in the manner above described, the laminations composing each unit are clamped and held together as a unit and may be handled as such. These sections are mounted upon and securely fastened to the faces of the head 12 and ram 40 in any suitable or convenient manner, as for instance, by means of bolts 17, or in any other suitable manner. If desired, the metallic mold halves or sections 22, 53, may likewise be securely clamped and held in place by the bolts 17 engaging in ears 23' thereon.

Of course it will be understood that the mold halves or sections are of metal and are shaped on their opposed faces to correspond to the contour of the exterior surface of the tire or other article to be vulcanized, so that when the mold sections are forced toward each other the tire or other article is received between the mold sections and is subjected to the desired pressure during the vulcanizing operation.

In such an apparatus as is above described, it is important to provide means for properly supporting and positioning the tire, or other article, in place, between the opposed surfaces of the mold sections or halves. In the arrangement shown as an embodiment of my invention the mold section or half 22 together with its associated transformer parts, is stationary, while the mold section or half 53 carried by the ram 40, together with its associated transformer parts, is movable towards and from the stationary section. With such an arrangement it is desirable to provide means for supporting the tire, or other article, which will permit the ready and easy application thereto or removal therefrom of the tire or article to be vulcanized. This may be accomplished in many ways. A simple arrangement is shown wherein provision is also made for a sidewise movement of the tire or article to be vulcanized so as to be forced by the movable mold section against and into the stationary mold section when the parts are brought together, and which also acts to displace the tire or other article away from the stationary mold section when the mold sections are separated after completion of the vulcanizing operation. In the arrangement shown a metallic core 31 is employed upon which is built, or to be applied, the tire A, or other article to be vulcanized. This core is of metal, and is annular in the case of an automobile tire, and is provided with an annular radial flange or web 30 extending inwardly and formed with inclined side surfaces 29. Mounted in the head 12 is a rod 24 carrying a spider 27 at its inner end, the hub portion of said spider being threaded upon the inner end of rod 24. The spider includes radial arms 28 which are beveled at their outer ends to correspond to the bevel 29 at one side of the radial flange 30 of the core. Upon the extreme end portion 36 of the rod 24 is rotatively mounted a disk 35 to which are pivotally connected at one end toggle links 34, the other ends of said toggle links being connected to radially moving arms 33 having beveled outer ends corresponding to the bevel of the outer ends of the spider arms 28 and to the bevels on the other side of the radial flange 30 of the core. The beveled end surfaces of the arms 33 and 28 cooperate to form and constitute a releasable supporting seat for the core 31. The arms 33 may be guided in their radial movements in any suitable maner, as for instance, by means of channel guides indicated at 32. Any desired means may be employed for rotating the disk 35 to effect the clamping or release of the core 31. A simple arrangement is shown wherein an arm 37 is fixed to the disk 35. By applying a suitable handle 38 to the arm 37 rotative movement may be easily imparted to said disk to project or withdraw the clamping and supporting arms 33. The rod 24 is held against rotative movement in any suitable convenient manner. A simple arrangement is shown wherein the outer end portion 25 of the rod 24 is of angle shape in cross section and is received through a correspondingly formed opening in a plate 26 fastened to the outer face of the head 12. In order to permit the laterally shifting movements of the core and tire, or other article, as above described, the rod 24 is mounted to slide longitudinally in its bearing in head 12. A spring 27' is interposed between the spider 27 and the inner face of head 12, and normally exerts its tension to press the spider and with it the tire and core, if a core is used, away from the fixed mold section 22, but which permits the spider 27 and rod 24 to be shifted in a direction to cause the tire and its core carried thereby to be forced under pressure into the mold half or section 22 when the ram 40 is advanced to its work. This very materially facilitates the work of applying and positioning a tire in place to be vulcanized or the removal thereof after completion of the vulcanizing operation.

Any suitable means may be employed for advancing the ram member 40 under power to close the mold sections and the transformer core sections upon each other, and to apply the desired pressure to the tire or article to be vulcanized. A simple arrangement is shown, to which, however, my invention is not to be limited, wherein a plunger 41 is mounted to operate in a cylinder 43 and is connected to the ram 40. A piston 42 at the end of the plunger 41 receives a pressure medium supplied to the cylinder 43 through any convenient pressure supply connection indicated at 44.

After the completion of the vulcanizing operation it is desirable to withdraw the ram 40 in order to separate the mold sections and their associated transformer parts. The withdrawal of the arm 40 may be accomplished in many different ways. A simple arrangement is shown to which my invention however is not to be limited, wherein vertically disposed guide standards 54 are secured to the head 11, and a weight 56 is mounted to slide vertically between and be guided by said guide members. Suitable connections 57 are connected on one end to the weight 56 and after passing over guide rollers 55 at the upper end of the guides 54 and guide rollers 58 at the lower portion of said guides are connected to straps 59 secured to the ram 40. With this arrangement it will be seen that as the ram 40 is advanced under power operation to close the mold sections together the weight 59 is elevated, and when the pressure medium supply connection 44 is open to exhaust the weight 56 is permitted to descend and thereby to effect the withdrawal of the ram 40 from its advanced position.

If desired, the guide standards 54 may be utilized to support a panel 60 upon which are mounted the various instruments, switches, etc., required in the control and operation of the electric heating parts of the apparatus. Thus in the arrangement shown, the panel carries the main switch 61, an ammeter indicated at 65, a voltmeter indicated at 66, a thermometer indicated at 64, a thermostat 63, and circuit control switch 62. These various parts are of ordinary structure, and may be varied, altered or replaced, of course, according to the manner of control to be effected of the electrical parts of the apparatus.

It is desirable in apparatus of this nature to chill or cool the mold sections after the completion of the vulcanizing operation in order to enable the removal of the vulcanized article and its core, where a core is employed, and the replacement of another to be vulcanized in proper position and relation without danger of injury through contact with the heated parts. This result may be accomplished in many specifically different ways. I have shown one arrangement for accomplishing the result as illustrative of a practical means for the purpose wherein passages 67 are formed in the mold sections 22, 53, through which a suitable cooling medium may be transmitted. The cooling medium may be supplied to the passages 67 in any convenient way, as for instance, through the supply and delivery connections 69, 70.

From the foregoing description it will be seen that I provide an exceedingly simple and efficient vulcanizing apparatus wherein a metallic mold is formed in separable halves or sections which are movable, the one towards and away from the other, and each having associated therewith a primary coil of a transformer, and one or more transformer core unit sections, and wherein the article to be vulcanized is supported in position between the mold halves or sections for yielding movement sidewise or laterally with respect to the mold sections, whereby when the mold sections are brought together or closed upon each other the article to be molded is clamped and held under pressure within the mold. At the same time the transformer core unit sections respectively associated with the mold halves or sections are brought into cooperative relation with respect to each other so as to be threaded through or to encompass the primary coils of the transformer as well as the mold sections or portions thereof, thereby constituting the metallic mold when the sections thereof are closed upon each other, particularly in the case of an annular article to be vulcanized such as an automobile tire, a single turn secondary of the transformer short circuited upon itself. Where the article to be molded is formed upon or carried by a metallic core, the transformer core unit sections associated with the respective halves or sections of the mold, when brought together likewise thread through the core, and by employing a metallic core such core likewise forms a closed secondary of the transformer short circuited upon itself. With this arrangement, through the ratio of the turns of the primary coil of the transformer with respect to the secondary coil, an electric current of large volume and low pressure will be induced in the metallic mold, as well as in the metallic core, where a core is used, according to the well known principles of operation of the transformer. The current thus generated or induced in the mold, or in the mold and core, cause such mold or mold and core to become heated, which heat is supplied to the tire or other article required, in conjunction with the pressure applied thereto, to effect the desired vulcanization thereof.

The degree of the heat thus generated may be controlled in any manner well known in the art, as, for example, by varying the members of the live turns in the primary coil of the transformer or by varying the current supplied to such primary coil. For example, one well known method of such control is accomplished by tapping in on the primary coil of the transformer at various points. I do not desire however to be restricted in this respect.

In practice I prefer to connect the primary coils 18, 51, in series in a circuit connected with a suitable source of current.

Figure 1:
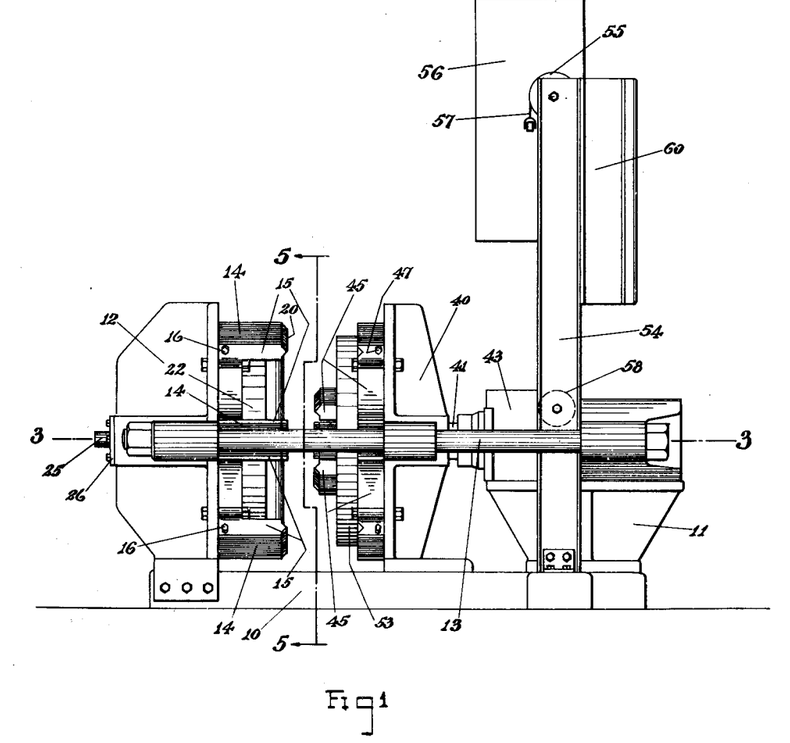
Fig. 1 is a view in side elevation of a vulcanizing apparatus embodying my invention.
Figure 2:
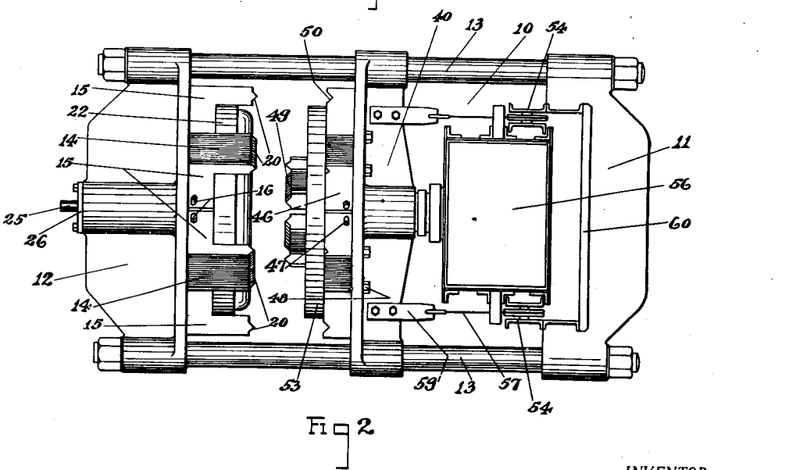
Fig. 2 is a top plan view of the same.
Figure 3:
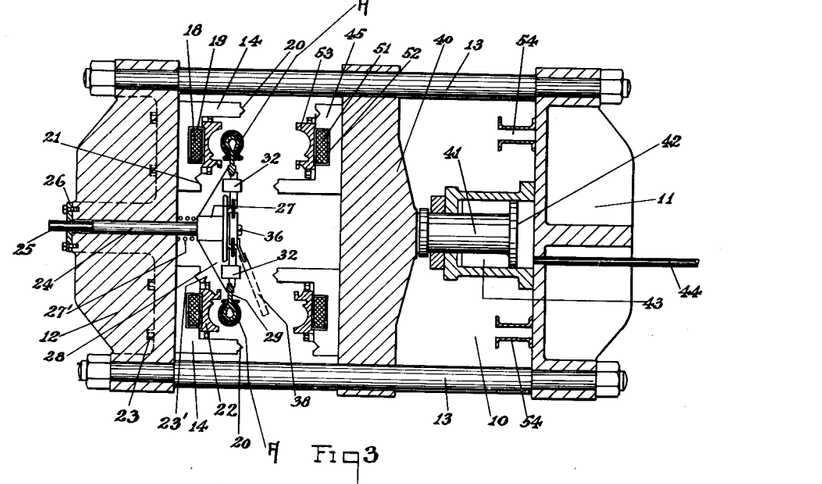
Fig. 3 is a view in horizontal section on the line 3, 3, Fig. 1, looking in the direction of the arrows.
Figure 4:
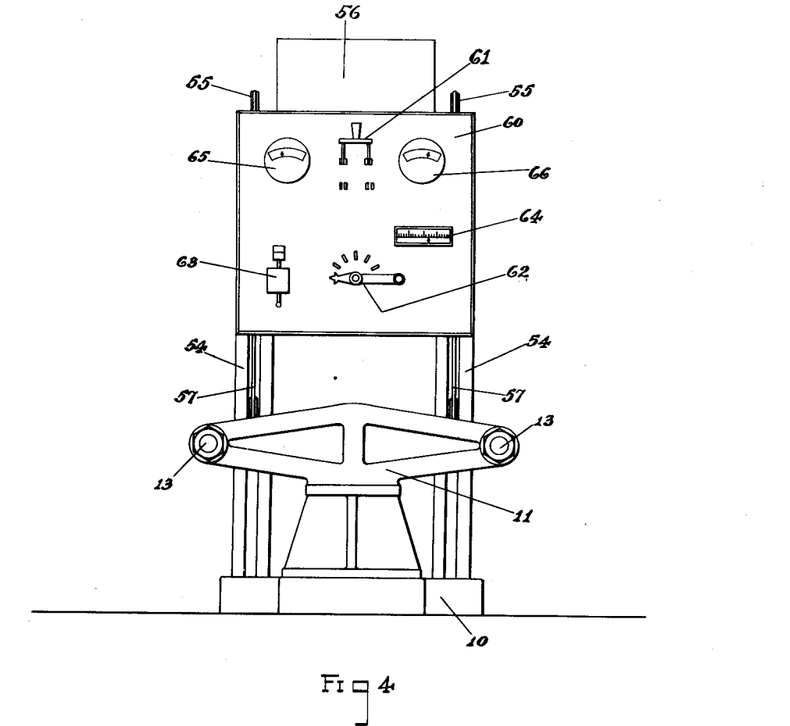
Fig. 4 is a view in end elevation.

The operation of the apparatus is exceedingly simple. Assuming the parts to be in their respective relative positions as shown in Fig. 3, with the mold sections with their associated transformer elements separated apart from each other, the tire, or other article to be vulcanized, is placed in position upon the releasable support therefor afforded by the spider arms 28, and the radially movable arms 33. The latter are then projected radially outwardly into clamping position with reference to the carrier for the article to be vulcanized, in this instance with reference to the core, by manipulating the handle 38 to effect a rotative movement of the disk 35. This operation positions the article to be vulcanized in proper relation with reference to the mold halves or sections, and at the same time removably supports such article. Power is then applied to advance and close the mold sections with their associated transformer elements upon each other, and to exert the desired vulcanizing pressure upon the article to be vulcanized, and coincidently therewith to bring the complementary transformer core unit sections into cooperative relation with respect to each other. The yielding support for the article to be vulcanized permits the article to be forced home to its seat in the stationary mold half or section. Electric current is then supplied to the primary winding of the transformer, resulting in the generation of current in the metallic mold, or the core carrying the article to be vulcanized, or both, operating as secondaries of the transformer, thereby generating and supplying the necessary heat for vulcanization coincidently with the application of pressure to the article to be vulcanized. After continuing the heating action for the desired period of time the current supply is cut off. Thereafter, in accordance with the best practice, the article to be vulcanized is maintained under pressure within the heated mold the desider length of time to complete the vulcanizing action. The mold sections are then cooled or chilled and are separated apart from each other to permit the vulcanized article to be removed which is accomplished by releasing the clamping arms 33 of the support and the positioning of a new article to be vulcanized in place for a repetition of the operation. As the mold sections are separated, the vulcanized article and its support are shifted laterally away from the fixed half or section of the mold, in this instance by the tension of spring 27'.

Thus it will be seen that I have provided an electric vulcanizing apparatus which is expeditious in its operation, and which permits quick and easy positioning and replacement of the articles to be vulcanized, thereby greatly facilitating and reducing the cost of the vulcanizing operation. It will also be seen that I am enabled to maintain the desired vulcanizing heat electrically by utilizing the heating effect of the electric current induced in the mold, or the core, or both, according to the principles of current generation within the secondary circuits of the transformers, thereby again securing great facility and economy as well as expedition in effecting the vulcanization.

It is to be understood that many variations and changes in the details of structure and arrangement as shown and described will readily occur to persons skilled in the art without departure from the spirit and scope of my invention.

I do not desire therefore to be limited or restricted to the exact details shown and described, but having now set forth the objects and nature of my invention and a structure embodying the principles thereof, what I claim as new and useful and of my own invention and desire to secure by Letters Patent is,—

1. An apparatus for vulcanizing rubber tires comprising a fixed, annular, mold section, a movable, annular, mold section, means for supporting the tire to be vulcanized between said sections, means for moving the movable section towards the fixed section to place the tire under pressure, a primary coil, and a transformed core including a fixed core section and a movable core section moving with the movable mold section, said transformer core sections being so arranged as to engage each other to constitute a closed magnetic path when the mold sections are brought together upon the tire, whereby said mold sections become the secondary of the transformer and vulcanizing heat is generated therein.

2. An apparatus for vulcanizing rubber tires comprising a relatively fixed member, a movable member, an annular mold section carried by each of said members, a plurality of transformer core sections secured to said members and having portions lying between the adjacent mold section and the member to which it is secured, a supporting member positioned to support a tire to be vulcanized between said mold sections, pressure means for moving the movable member towards the fixed member to close the mold sections upon the tire, said transformer core sections engaging each other when the mold sections are closed upon a tire and constituting a closed magnetic path through which the annular mold sections are threaded, and a primary coil also threaded through said closed magnetic path.

3. An apparatus for vulcanizing rubber tires comprising a pair of mold-carrying members, pressure means for moving one of them toward the other, a mold section carried by each of said members, a transformer core section carried by each of said members and having a portion lying between the corresponding mold section and the mold-carrying member, said transformer core sections engaging, when the mold sections are brought into contact with each other, to form a closed magnetic path through which the annular mold sections are threaded, a primary coil also threaded through said closed magnetic path, and means for supporting a tire to be vulcanized between said mold sections.

4. An apparatus for vulcanizing rubber tires comprising a pair of mold-carrying members, pressure means for moving one of them toward the other, an annular mold section carried by each of said members, a plurality of transformer core sections carried by each member, each of said sections having a portion lying between the corresponding mold section and the mold-carrying member and opposed transformer core sections being aligned and arranged to engage each other to form closed magnetic paths, through which the annular mode sections are threaded, when the mold-carrying members move toward each other, a primary coil also threaded through said closed magnetic paths, and means for supporting a tire to be vulcanized between said mold sections.

5. An apparatus for vulcanizing rubber tires comprising a pair of mold-carrying members, pressure means for moving one of them toward the other, mating transformer core sections carried by the respective mold-carrying members and adapted to engage each other, when the mold-carrying members are brought together, to form closed magnetic paths, annular mold sections carried by said members with said transformer core sections lying between the mold sections and the carrying members, primary coils lying between said transformer core sections and said mold sections, whereby said primary coils and mold sections are threaded through the closed magnetic paths formed by the mating transformer core sections, and means for supporting a tire to be vulcanized between said annular mold sections.

6. An apparatus for vulcanizing rubber tires comprising a pair of mold-carrying members, pressure means for moving one of them toward the other, a transformer core made up of separable sections, one section being carried by each of said mold-carrying members, and each section comprising a plurality of laminations clamped together to form a unit and secured edgewise upon the mold-carrying member, the laminations of the separable sections being so shaped with reference to each other as to form a closed magnetic path when the separable sections are brought together, an annular mold section carried by each member in front of said transformer core sections, a primary coil carried by one of said mold-carrying members in front of said core sections, whereby said primary coil and annular mold sections will be threaded through the closed magnetic path formed by said transformer core, when the mold sections are brought together, and means for supporting a tire to be vulcanized between said annular mold sections.

7. An apparatus for vulcanizing rubber tires comprising a pair of mold-carrying members, a transformer core made up of separable sections, one section being carried by each of said mold-carrying members, and each section comprising a plurality of L-shaped laminations clamped together to form a unit and secured edgewise upon the mold-carrying member, an annular mold section secured to each mold-carrying member in front of said laminations, a primary coil also supported in front of said laminations, means for supporting a tire to be vulcanized between said mold sections, and pressure means for moving one of said mold-carrying members toward the other to close the mold sections upon the tire to be vulcanized and to bring said separable transformer core sections into engagement, forming a closed magnetic path through which the primary coil and annular mold sections are threaded.

8. An apparatus for vulcanizing rubber tires comprising a pair of mold-carrying members, a transformer core made up of separable sections carried by said mold-carrying members, each section comprising a plurality of L-shaped laminations clamped together to form a unit and secured edgewise upon the mold-carrying member, said laminations having notches in their forward edges forming grooves in said sections, primary coils positioned in said grooves, annular mold sections secured to said mold carrying members overlying said grooves and primary coils, means for supporting the tire to be vulcanized between the mold sections, and pressure means for moving one of said mold-carrying members toward the other to close the mold sections upon the tire and bring said separable transformer core sections into engagement forming a closed, magnetic path through which the primary coils and annular mold sections are threaded.

9. An apparatus for vulcanizing rubber tires comprising a pair of mold-carrying members, annular mold sections carried by said members and coaxial with respect to each other, a plurality of transformer core sections radially disposed with reference to the axis of the mold sections and secured to the mold-carrying members, a primary coil coaxial with said mold sections, means for supporting the tire to be vulcanized between said mold sections, and coaxially therewith, and pressure means for moving one of said mold-carrying members axially toward the other to close said mold sections upon the tire and to bring said transformer core sections into engagement to form a closed, magnetic path encircling the primary coil and annular mold sections.

10. An apparatus for vulcanizing rubber tires comprising a pair of mold-carrying members, a transformer core comprising separable sections carried by said members, an annular mold section carried by each of said members and positioned in front of the adjacent transformer core sections, a primary coil supported coaxially with said mold sections, means for supporting an annular forming core, with the tire to be vulcanized thereon, between said mold sections, and pressure means for moving one of said mold-carrying members toward the other to close the mold sections upon the tire and bring the transformer core sections into engagement, forming a closed magnetic path encircling the annular mold sections, the annular forming core and said primary coil.

11. An apparatus for vulcanizing rubber tires comprising a fixed frame member, an annular mold section carried by said frame member, a plurality of transformer core sections also carried by said frame member and having portions lying between the mold section and the frame member, a ram mounted to move toward and from the fixed frame member, an annular mold section carried thereby coaxial with the first-named mold section, a plurality of transformer core sections carried by said ram, parts of which lie between the mold section and the ram, a supporting shaft slidably mounted in the fixed frame member, a supporting spider carried by said shaft and adapted to support an annular forming core, carrying the tire to be vulcanized, between and coaxial with said mold sections, pressure means for moving the ram toward the fixed frame member to close the mold sections on the tire and bring the transformer core sections into engagement forming a closed magnetic path encircling the annular mold sections and forming core, and a primary coil so supported as to thread through said closed magnetic path.

12. An apparatus for vulcanizing rubber tires comprising a fixed frame member, a movable ram, annular mold sections carried by said frame member and said ram and coaxial with each other, a plurality of transformer cores comprising separable sections carried by the frame member and ram respectively and so positioned as to encircle the mold sections when brought together, a supporting shaft slidably mounted in the fixed frame member, a supporting spider carried by said shaft and detachably carrying an annular forming core carrying the tire to be vulcanized, a spring interposed between said spider and the fixed frame member, pressure means for moving the ram towards the fixed frame member to close the mold sections on the tire and bring the transformer core sections into engagement forming a closed magnetic path encircling the annular core and mold sections, and a primary coil supported in position to be encircled by said separable core sections when brought together.

13. An apparatus for vulcanizing rubber tires comprising a fixed frame member, a movable ram, annular mold sections coaxial with each other and carried by said frame member and ram, respectively, a transformer core comprising separable sections carried by said frame member and ram, means for supporting an annular forming core carrying the tire to be vulcanized coaxial with and between said mold sections, primary coils suitably connected in a primary circuit and carried by said frame member and ram respectively, and pressure means for moving the ram toward the fixed frame member to close the mold sections upon the tire and bring the transformer core sections into engagement forming a closed magnetic path interlinking said primary coils and the annular mold sections and forming core.

14. An apparatus for vulcanizing rubber tires comprising a fixed frame member, a movable ram, annular mold sections carried by said frame member and ram respectively, means for supporting a tire to be vulcanized coaxial with and between said mold sections, a primary coil, fluid pressure mechanism for moving said ram toward the fixed frame member to close the mold sections upon the tire, and a transformer core made up of separable sections carried by the frame member and ram respectively and adapted to be brought together by the movement of the ram so as to form a closed magnetic path interlinking the primary coil and the annular mold sections.

15. An apparatus for vulcanizing rubber tires comprising a fixed frame member, a movable ram, annular mold sections carried by said frame member and ram respectively, means for supporting a tire to be vulcanized coaxial with and between said mold sections, a primary coil, fluid pressure mechanism for moving said ram toward the fixed frame member to close the mold sections upon the tire, automatic mechanism for withdrawing the ram when the pressure is relieved, and a transformer core made up of separable sections carried by the frame member and ram, respectively, and adapted to be brought together by the movement of the ram so as to form a closed magnetic path interlinking the primary coil and annular mold sections.

16. In an electric vulcanizing apparatus, separable metallic mold sections, each having transformer elements associated therewith, and means to position an article to be vulcanized in the space between said sections, in combination with means to close said mold sections under pressure upon the article to be vulcanized, and to bring the transformer elements into position to constitute a transformer with the mold forming the secondary thereof.

17. In an electric vulcanizing apparatus, a mold having relatively movable sections, transformer elements associated with each of said sections, a metallic core for the article to be vulcanized, and means to position said core and article in the space between the opposed surfaces of said mold sections, in combination with means to close said mold sections under pressure upon said core and article and to bring the said transformer elements into position to constitute a transformer with the metallic core forming the secondary thereof.

18. In an electric vulcanizing apparatus, a mold having relatively movable sections, a metallic core for the article to be vulcanized, a support to position the core and article in the space between the opposed surfaces of said mold sections, and means to detachably mount said core upon said support, in combination with means to close said mold sections under pressure upon said core and article, and means to induce an electric heating current in said core when said mold sections are closed thereon.

19. In an electric vulcanizing apparatus, a metallic mold formed in relatively movable sections, each having transformer elements including a transformer core section associated therewith, a metallic core carrying the article to be vulcanized, means to position said core and article in the space between said mold sections when the latter are separated from each other, in combination with means to close said mold sections together under pressure and upon the article to be vulcanized to bring the transformer core sections into cooperative relation with each other and threaded through said closed mold and core to constitute a transformer with the closed mold and core forming secondaries thereof.

20. An apparatus for vulcanizing rubber tires comprising relatively movable members, each of said members having associated therewith a transformer core section, an annular mold and a primary coil, and a common motor means for moving said relatively movable members toward each other whereby the transformer core sections engage each other to constitute a closed magnetic path and the mold sections surround the tire to place the same under vulcanizing pressure.

21. An apparatus for vulcanizing rubber tires comprising relatively movable members, transformer core sections carried by said members, annular mold sections also carried by said movable members, primary coils disposed and held in position between said core sections and said mold sections, and common means for moving the relatively movable members toward each other to close the mold sections upon the tire and bring the transformer sections into engagement to form a closed magnetic path inter-linking said primary coils and the annular mold sections.

22. An apparatus for vulcanizing rubber tires comprising relatively movable members, a plurality of transformer core sections symmetrically arranged upon the opposing faces of said movable members, annular mold sections supported by and secured to the inner faces of said core sections, and primary coils disposed between said core sections and said mold sections, the respective core sections, mold sections and primary coils associated with each of said movable members being of substantially identical form whereby upon movement of said members toward each other the said elements will form a complete transformer with the annular mold sections forming a closed, single turn secondary thereof.

23. An apparatus for electrically vulcanizing rubber tires comprising relatively movable members, transformer core sections associated with each of said members and symmetrically arranged thereon, each of said core sections being recessed to provide an annular seat for a primary coil, mold sections secured to the opposing faces of said transformer core section and covering said recesses, and a primary coil seated in said recesses and secured therein by said annular mold sections.

24. An apparatus for vulcanizing rubber tires comprising members mounted for aligned relative movement, primary coils and annular mold sections associated therewith, a plurality of transformer core sections radially disposed on each of the opposing faces of said aligned members, said transformer sections forming annular seats for said primary coils and annular mold sections, all of said elements being complementally formed whereby upon movement of the members toward each other a complete transformer will be formed with the annular mold forming the closed single turn secondary thereof.

25. An apparatus for vulcanizing rubber tires comprising relatively movable members, each of said members having associated therewith transformer sections, a primary coil and an annular mold section, and one of said members having a means for supporting an annular core section independent of and normally out of contact with the annular mold sections when the latter are in open position.

26. An apparatus for vulcanizing rubber tires including a plurality of transformer core sections, each of said core sections being recessed to provide an annular seat for a primary coil, a mold section secured to said transformer core section and covering said recesses, and a primary coil seated in said recesses and secured therein by said annular mold section.

In testimony whereof, I affix my signature.

JOSEPH LEDWINKA.